Feb. 23, 1932.                O. F. PACKER                1,846,977
                        ROLLER BEARING JOURNAL BOX
                          Filed Feb. 11, 1927        2 Sheets-Sheet 1
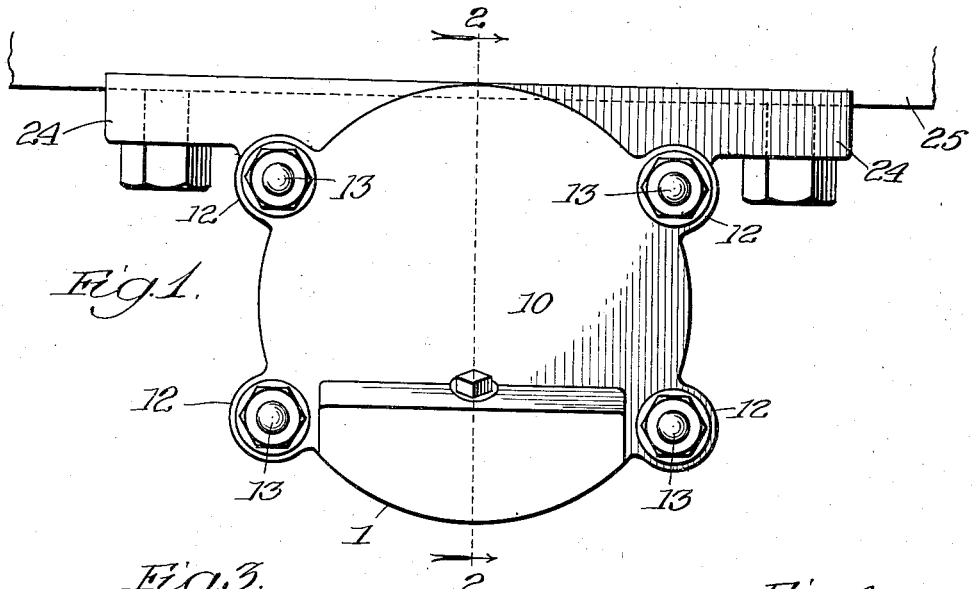
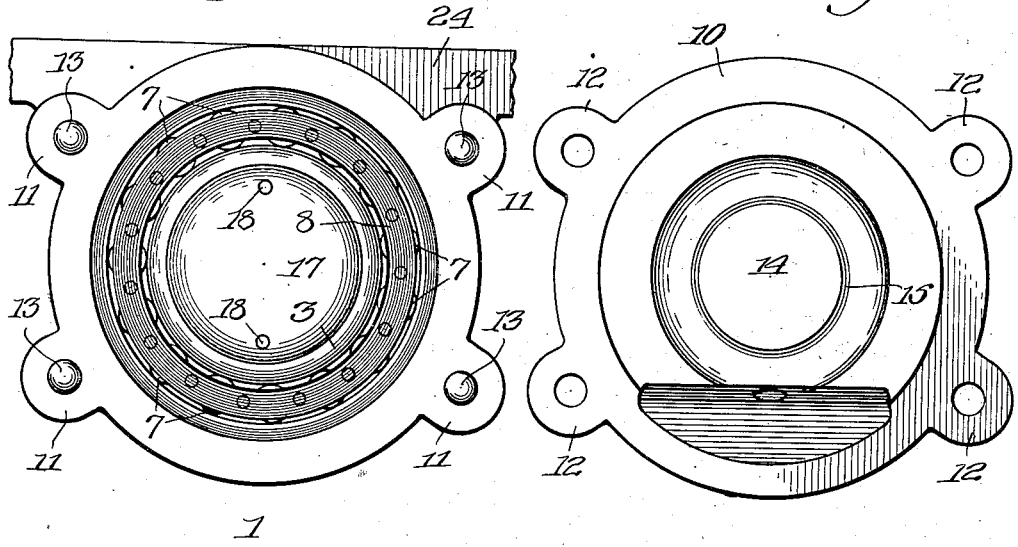
Inventor:
Oswald F. Packer, Feb. 23, 1932.  O. F. PACKER  1,846,977
ROLLER BEARING JOURNAL BOX
Filed Feb. 11, 1927   2 Sheets-Sheet 2
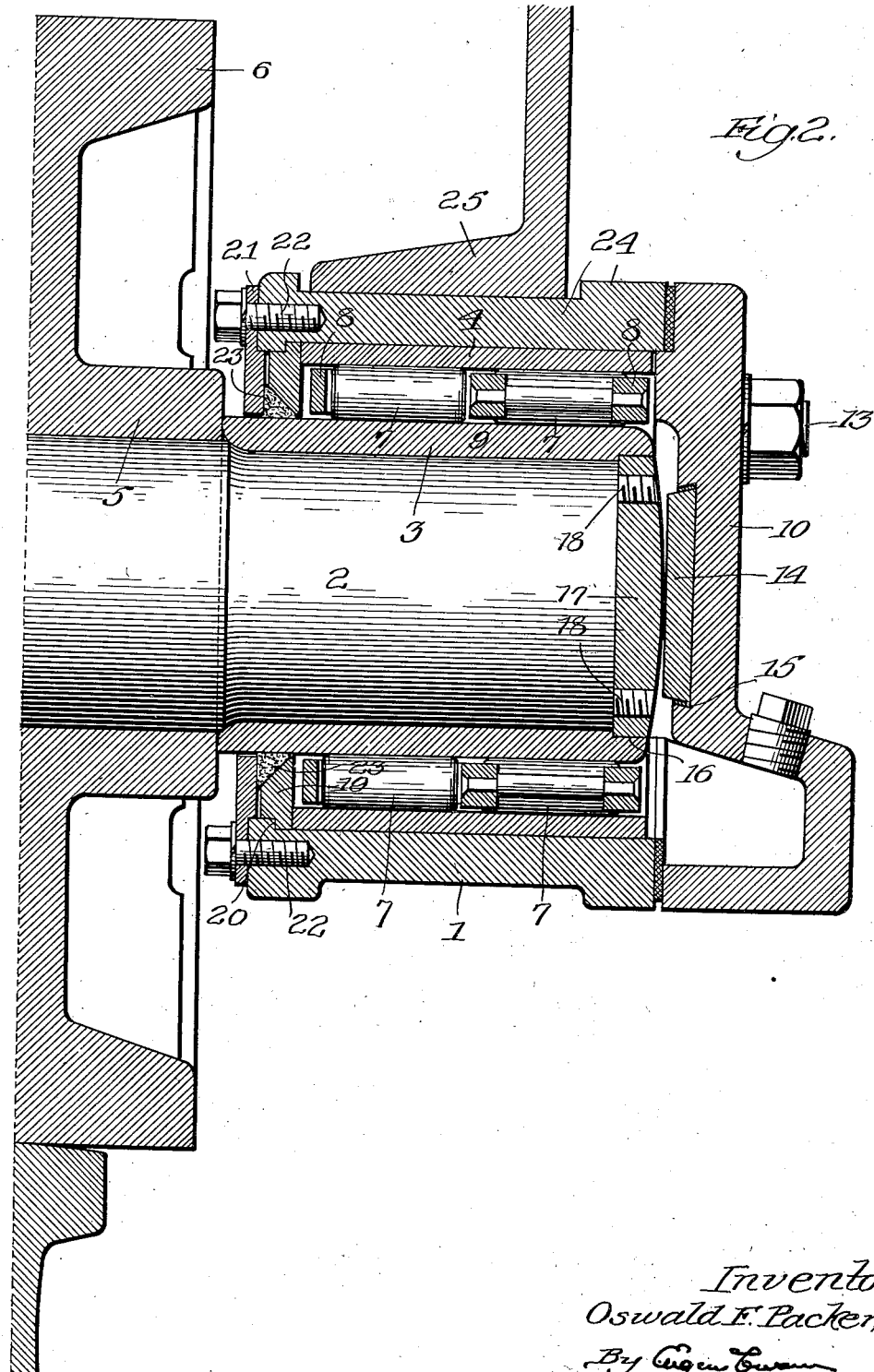
Inventor:
Oswald F. Packer, Patented Feb. 23, 1932

1,846,977

UNITED STATES PATENT OFFICE

OSWALD F. PACKER, OF LAWTON, MICHIGAN, ASSIGNOR TO STEARNS-STAFFORD ROLLER BEARING COMPANY, OF LAWTON, MICHIGAN, A CORPORATION OF DELAWARE

ROLLER BEARING JOURNAL BOX

Application filed February 11, 1927. Serial No. 167,410.

This invention relates to improvements in roller bearing journal boxes and mountings therefor.

One object of my invention is to provide an end thrust cap for the outer end of the spindle mounted in the outer end of the bushing which is on the spindle so as to simplify and cheapen the construction by avoiding the use of an end thrust hood which necessitates making a much larger element which must extend over the outer end of the spindle to be carried thereby.

Another object of my invention is to have the end thrust cap mounted in the outer end of the bushing in such manner that the cap in conjunction with the cover of the box aids in holding the bushing from working outward off the end of the spindle.

A still further object of my invention is to have the bushing extend the full length of the spindle with the inner end of the bushing in contact with the hub of the wheel so that in conjunction with the end thrust mechanism at the front of the spindle the wheel is prevented from moving into contact with the box or its parts to do injury.

Another object of my invention is to provide a simple and efficient form of packing means about the spindle at the rear end of the box.

The invention consists further in the matters hereinafter described and claimed.

In the accompanying drawings—

Fig. 1 is a front elevational view of a journal box constructed and mounted in accordance with my invention;

Fig. 2 is an enlarged longitudinal vertical sectional view taken through the box on line 2—2 of Fig. 1;

Fig. 3 is an end view of the box with the cover removed; and

Fig. 4 is an inside view of the cover.

In the drawings, 1 indicates the body of the box and 2 the axle spindle extending into the box through its rear end. Disposed in the box are inner and outer hardened bushings 3, 4, preferably made of steel. The inner bushing 3 has a pressed fit on the spindle 2 and extends the full length of the spindle, as shown in Fig. 2. The inner end of the bushing has contact with the hub 5 of the wheel 6. Located between these bushings is an antifriction bearing means preferably in the form of bearing rollers 7, 7. In the particular construction shown in the drawings, two groups or series of these rollers are employed, with the rollers in one group staggered with respect to those in the other and retained in a suitable cage embracing the outer rings 8, 8 and an intermediate ring 9. The outer bushing 4 may have a tight fit in the box, the latter being shaped to receive and retain it.

For the outer end of the box there is a cover 10. The body of the box and the cover are preferably provided at the opposite sides thereof with co-operating lugs 11, 12, through which are passed bolts 13, 13 for securing the cover to the box. The cover is provided on its inside with an end thrust bearing surface 14, which may take the form of a hardened metal plate set in a recess suitably provided in the inside of the cover, as shown in Fig. 2. This plate is held in its recess by a metal fitting 15, which may be Babbitt metal or other suitable material.

The inner bushing 3 extends beyond the outer end of the spindle 2 and there is provided with an undercut groove 16 to receive a hardened thrust cap 17. This cap has a close fit in the groove 16 and provides an end thrust bearing surface for the outer end of the spindle. The cap 17 is directly opposite the plate 14 and the outer surface of the cap is curved so as to reduce the amount of friction between the parts when the spindle moves the cap against the plate. To facilitate removing the cap 17 from the outer end of the bushing 3 when the cover 10 is off the box, I provide the cap with a pair of screw-threaded holes 18, 18, so that the removing tool may be readily threaded into these holes for connection with the cap. At the inner end of the box, I provide a simple form of packing structure. This consists of a guide ring 19 for the inner end of the bearing roller cage and held by the outer bushing 4 against a shoulder 20 provided about the box just inside of its rear end. A back cover 21 is secured by cap screws 22 to the rear end of the box and extends toward the spindle and having the required clearance with the inner bushing 3 where it extends beyond the rear of the box. The inner edge of the ring 19 is cut away or beveled off to provide a wedge-shaped chamber between the ring and the back plate 21 in which is located suitable packing material 23 so as to keep lubricant from working out of the rear end of the box.

The bearing as shown and described is particularly designed for slow moving rolling stock, such as turn-tables. To mount the box 1 on the frame of such device, I provide the box on opposite sides with laterally projecting lugs 24, 24. These lugs are so disposed as to be bolted to the under side of a cross-member 25 of the frame of the device where it extends over the top of the box. As shown in Fig. 1, the lugs 24, 24 are cast integral with the body of the box and are integrally connected across the top of the box by metal which is cast to the box between them.

I claim as my invention:

1. In an assembly of the character described, the combination with a journal box, of an axle spindle extending into said box through the rear end thereof, a cover secured over the front end of the box and having an end thrust surface on the inside of the same, a one-piece hardened bushing having a pressed fit on the spindle and projecting beyond the front end of the same and there open to receive a hardened cap, a hardened cap made independent of the spindle and fitted against the end of the same in the opening at the projecting end of the bushing and having a rounded outer surface engageable with the thrust surface of the cover, and antifriction bearing means in the box between the same and the bushing.

2. In an assembly of the character described, the combination with a journal box, of an axle spindle extending into the box through the rear end of the box, a cover secured over the front end of the box and having a thrust surface on the inside of the same, a one-piece hardened bushing having a pressed fit on the spindle, said bushing having its outer end recessed and projecting beyond the front end of the spindle, a hardened cap made independent of the spindle and fitting against the end of the same in the recessed outer end of the bushing and having a curved outer surface engageable with the thrust surface of the cover, and antifriction bearing means in the box between the same and the bushing.

3. In an assembly of the character described, the combination with a journal box, of an axle spindle extending into the box through its rear end, a cover secured to the front end of the box, a one-piece hardened bushing having a driving fit on the spindle, said bushing having its front end extending beyond the front end of the spindle and there open to receive a hardened cap, a hardened cap made independent of the spindle and fitting against the end of the same in the opening at the projecting front end of the bushing and having a curved outer surface, a hardened plate set in the inner surface of the cover opposite the cap to be engaged thereby under the end thrusts of the spindle, and antifriction bearing means in the box between the same and the bushing.

In testimony whereof I affix my signature this 5th day of February, 1927.

OSWALD F. PACKER.